ns
2,696,900

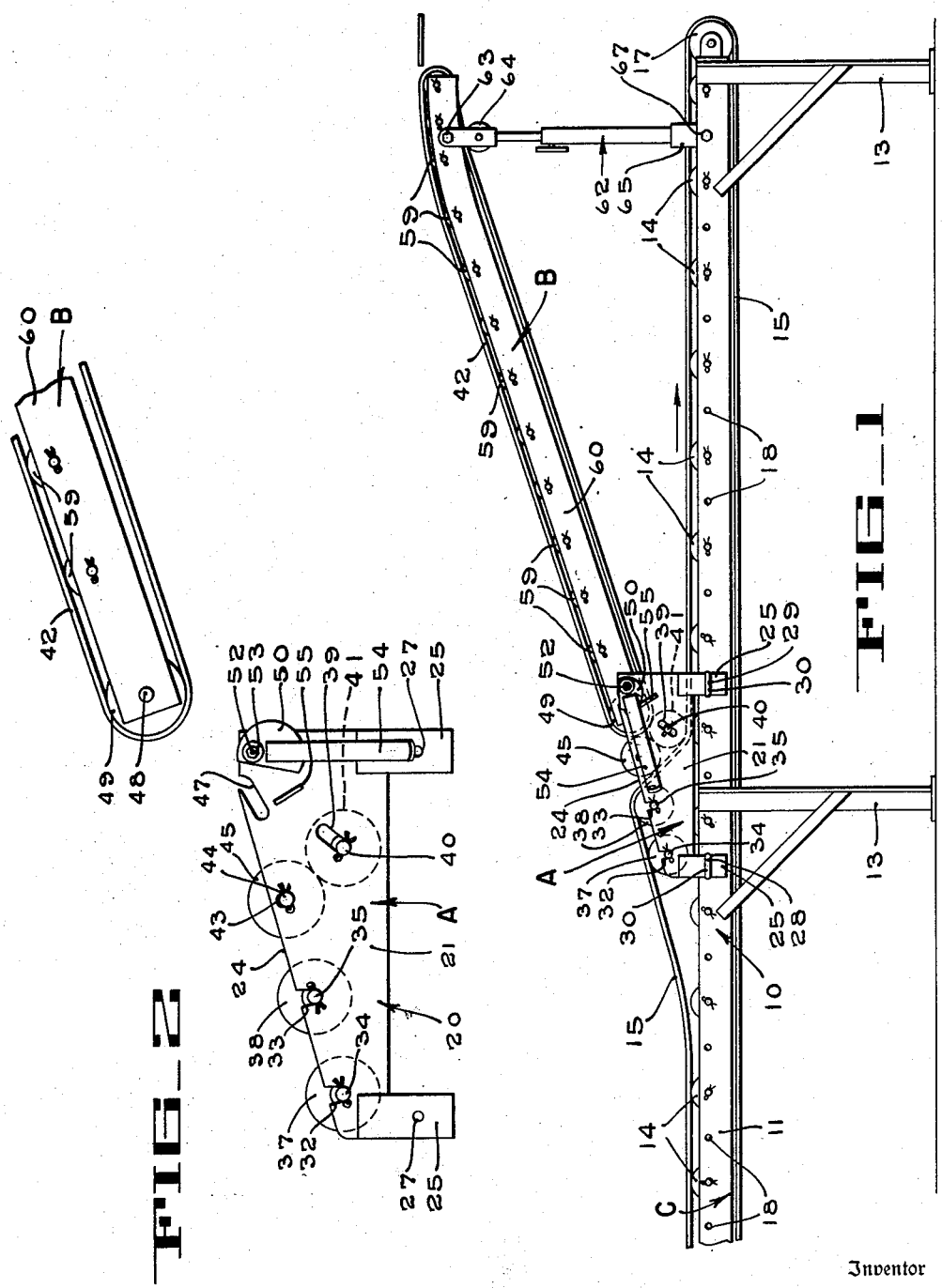

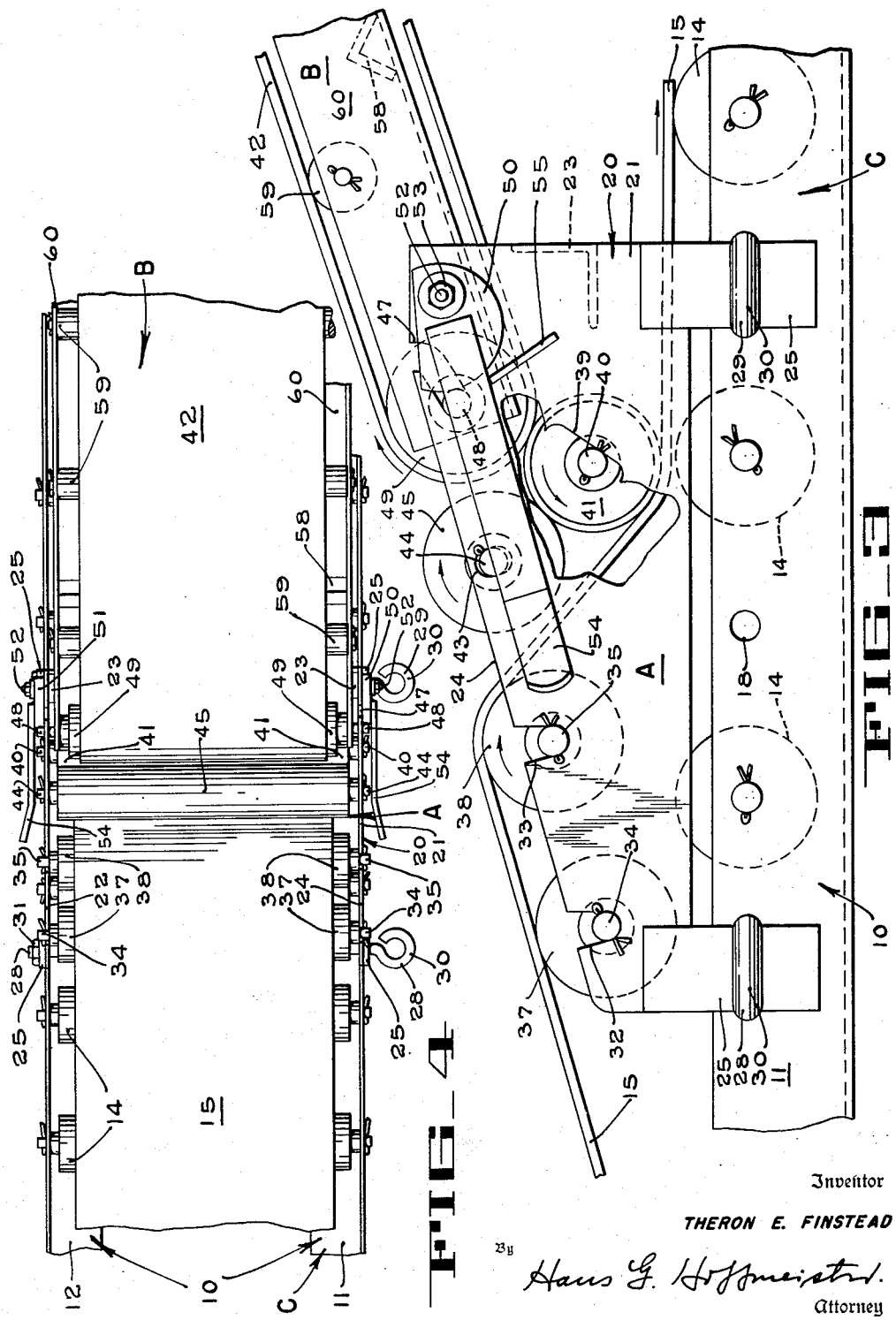

ARTICLE TRANSFER AND CONVEYER MECHANISM

Theron E. Finstead, San Jose, Calif., assignor to Food Machinery and Chemical Corporation, San Jose, Calif., a corporation of Delaware Application October 4, 1949, Serial No. 119,430

3 Claims. (Cl. 198—20)

The present invention relates to an apparatus for conveying articles, and more particularly to an apparatus for transferring conveyed articles from the belt of a main conveyor to the belt of an auxiliary conveyor while simultaneously driving the auxiliary conveyor belt.

One object of the present invention is to provide a mechanism for transferring articles from one conveyor belt to another conveyor belt.

A further object is to attach an auxiliary conveyor to a main conveyor at any desired point throughout its length for transferring articles from one of said conveyors to the other, and to drive the auxiliary conveyor belt from the main conveyor belt.

Another object is to provide means deriving power from a main conveyor belt for simultaneously driving an apparatus for transferring conveyed articles and an auxiliary conveyor belt.

Another object is to provide means whereby a portion of an upper run of a main conveyor belt is deflected from its normal plane and supported in an inclined plane tangential to a roller of an article transfer means.

Another object is to offset a portion of a main conveyor belt in a direction toward which it is desired to transfer an article on said belt and to deflect said belt beyond the offset portion by means adapted to drive an auxiliary belt mounted adjacent thereto.

Further objects and advantages of this invention will become apparent in the following drawings and descriptions in which:

Fig. 1 is a side elevation of a conveying apparatus embodying the invention, a portion of a main conveyor being broken away.

Fig. 2 is an enlarged side elevation of an article transfer and auxiliary conveyor driving apparatus, a portion of the auxiliary conveyor being illustrated as separated from the transfer and driving apparatus.

Fig. 3 is a further enlarged side elevation of the article transfer and auxiliary conveyor driving apparatus shown in Figs. 1 and 2, a portion of a side frame member thereof being broken away to show belt and roller arrangements, portions of the main and auxiliary conveyors also being shown.

Fig. 4 is a plan view, somewhat reduced, of the mechanism shown in Fig. 3.

In the drawings, an article transfer device A and an auxiliary conveyor B are adapted to be attached to a power driven main conveyor C at any desired point thereon without removing the main conveyor belt, but merely by loosening the main conveyor belt and threading it through the article transfer device and attaching the auxiliary conveyor thereto. The belt of the auxiliary conveyor is held in frictional driven engagement with a roller on the device A so as to transmit the power necessary to drive the belt of the auxiliary conveyor, and to transfer articles from one conveyor to the other. The article transfer device A is so arranged that the main belt and auxiliary belt are substantially aligned at the point of transfer between them, so that conveyed articles are stated on their transitional movement between the belts without encountering any sharp offset between the belts. This practically eliminates the possibility of the articles jamming at the point of transfer from one belt to the other.

As shown in Fig. 1, the main conveyor C, of a usual belt type, has a usual bed 10 comprising side frame members 11 and 12 and supporting legs 13. A series of freely rotatable belt supporting rollers 14 are mounted transversely between the side frame members 11 and 12 for supporting an endless main conveyor belt 15 which passes around the usual two terminal rollers, only one 17 of which is shown. The main conveyor belt 15 is driven by a usual head roller (not shown), or by other suitable means.

The article transfer and auxiliary belt driving apparatus A has a frame 20 which spans the bed 10 of the main conveyor C. The transfer frame 20 comprises two similar side frame plate members 21 and 22 secured together by a transverse angle iron member 23 welded therebetween. Each of the side plate members 21 and 22 has a sloping upper edge 24. Vertically disposed supporting legs 25 are welded to extend downwardly, one from each end of each of the frame side plate members 21 and 22, and are adapted to lie closely against the outer sides of the main frame side members 11 and 12, respectively. Each of the legs 25 is provided with a hole 27 in the downwardly extending portion thereof, these holes being adapted to register with any of a series of laterally opposite and similarly spaced holes 18 provided along the main conveyor side members 11 and 12. If, however, it is desired to use the transfer device on a conveyor not provided with such holes, a single set of mounting holes may be drilled at any desired location along any conveyor having a bed of the proper width upon which to mount the frame 20. The article transfer device A is mounted on the main conveyor C by two rods 28 and 29 inserted transversely through the registering holes 27 in the legs 25 and a desired set of holes 18 in the conveyor side frame members 11 and 12. Each of the mounting rods 28 and 29 has an eye 30 formed on an end thereof, and is secured in position by a nut 31 threaded onto the other end.

Two pairs of longitudinally spaced roller supporting notches 32 and 33, each pair of which is laterally opposite one another, are provided in the sloping upper edges 24 of the transfer apparatus side plates 21 and 22. The axial shafts 34 and 35 of two main conveyor belt supporting rollers 37 and 38 are mounted in the notches 32 and 33, respectively, to extend transversely of the transfer apparatus A. A pair of laterally opposite vertically inclined slotted holes 39 (Figs. 1 and 2), are provided in the side plate members 21 and 22. The axial shaft 40 of a main belt deflecting and auxiliary belt driving roller 41 is mounted to float in the holes 39. The drive roller 41 transmits a driving force from the power driven main conveyor belt 15 to the belt 42 of the auxiliary conveyor B, and deflects the main conveyor belt 15 back toward its normal plane after passing over the belt supporting rollers 37 and 38. A second pair of laterally opposite holes 43, are provided one in each of the transfer apparatus side plate members 21 and 22, to support the axial shaft 44 of a rotatable article transfer roller 45 therein. As shown in Fig. 3, the holes 43 are elongated slightly in a direction substantially normal to the sloping upper edges 24 of the side plates 21 and 22 to enable the transfer roller 45 to float on the drive roller 41 and, thereby, to maintain frictional driven engagement with the drive roller 41.

A pair of angularly offset notches 47 (Figs. 2 and 4) are provided, one in the upper edge of each of the transfer side plates 21 and 22 for receiving therein the ends of the axial shaft 48 of the lower terminal roller 49 of the auxiliary conveyor B. A pair of eccentric shaft securing cams, 50 and 51, are pivotally mounted on a pair of pins 52, only one of which is shown (Figs. 2 and 3), which are secured to the transfer apparatus side plate members 21 and 22, respectively, adjacent to the notches 47. A nut 53 is threaded onto each of the pins 52 to secure the cams 50 and 51 in position on the pins 52. Each cam has a handle 54 attached thereto whereby the cams 50 and 51 can be swung into engagement with the projecting end portions of the mounting shaft 48 of the lower terminal roller 49 of the auxiliary conveyor B to lock the shaft 48 in the bottoms of the offset notches 47. A pair of handle stops 55 are mounted on the transfer apparatus side plates 21 and 22 to engage the handles 54 and thereby to limit pivotal movement of the locking cams 50 and 51 in both directions.

The endless auxiliary conveyor belt 42 is supported in a usual manner by a series of rollers 59 mounted transversely between auxiliary conveyor side frame members 60 which are braced by a series of transverse frame members, only one of which 58 (Fig. 4) is shown. The upper end of the auxiliary conveyor 61 is supported by an adjustable standard 62 of a usual telescoping type. The upper end of the standard 62 spans the frame of the auxiliary conveyor B and is secured thereto by a bolt 63. A belt supporting roller 64 is provided transversely of the upper end of the standard 62 to prevent the auxiliary conveyor belt 42 from scraping on the standard 62. The lower end of the standard 62 has legs 65 which span the frame of the main conveyor C and are secured thereto by a bolt 67.

In operation, the article transfer and auxiliary conveyor drive apparatus A is mounted across the main conveyor bed at a desired point along its length by passing the eye bolts 28 and 29 through registering holes in the legs 25 and in the main conveyor side frame members 11 and 12. The main conveyor belt 15 is slackened off, and with the two belt supporting rollers 37 and 38 removed from their notches 32 and 33, the main conveyor belt 15 is raised up and these rollers 37 and 38 are inserted beneath it and their shafts 34 and 35 again are dropped into their supporting notches 32 and 33 in the transfer frame 20. The auxiliary conveyor B then is mounted with one end thereof supported on the standard 62 on the main conveyor bed 10 as shown in Fig. 1, and the shaft 48 of the lower terminal roller 49 of the auxiliary conveyor B is bottomed in the notches 47 and locked in position therein by the eccentric cams 50 and 51. The adjustable standard 62, then may be adjusted to position the upper end of the auxiliary conveyor belt 42 at a desired height.

After the article transfer and auxiliary drive apparatus A and the auxiliary conveyor B thus have been installed as shown in Figs. 1, 3 and 4, the main conveyor belt 15 is again tautened in a usual manner. This urges the main conveyor belt into frictional driving engagement with the drive roller 41 which in turn is urged upwardly in its slots 39 so that its upper peripheral surface is forced into frictional driving engagement with the under side of the auxiliary conveyor belt 42 as it passes around the lower terminal roller 49, in which position the transfer roller 45 rides on the drive roller 41. The main conveyor belt supporting rollers 37 and 38 are so positioned in their respective notches 32 and 33, and the transfer roller 45 is so positioned in its elongated holes 43 by contact with the drive roller 41, that an extension of the upper surface of the main belt 15 as it passes over the supporting rollers 37 and 38 is substantially tangential to the upper peripheral surface of the transfer roller 45.

After the main conveyor belt 15 has been tautened, it is driven by the usual power means (not shown). The movement of the main conveyor belt 15 rotates the drive roller 41 which in turn drives the auxiliary conveyor belt 42 and the transfer roller 45. Thus the upper run of the auxiliary conveyor belt 42 and the upper peripheral surface of the transfer roller 45 are driven in the same general linear direction as the upper run of the main belt 15.

Articles carried along the main belt 15 are deflected up the inclined plane formed therein over the supporting rollers 37 and 38 and are transferred across the substantially co-planar upper surface of the transfer roller 45 and thence, without substantial change in direction, onto the auxiliary belt 42 for conveyance toward the desired destination. It should be obvious that the transfer apparatus A and auxiliary conveyor B may be attached to the main conveyor in a direction opposite to that shown in Figs. 1, 2, 3, and 4, and also that the main belt 15 may be driven in either direction.

While the transfer roller 45 floats in the elongated holes 43 in order to avoid interference with movement of the drive roller 41 toward the auxiliary belt 42, adequate driving engagement with articles being transferred across the roller 45 is assured since the weight of such articles will force the transfer roller shaft 44 downward in the elongated holes 43 to insure adequate frictional contact between the transfer and drive rollers 45 and 41 and the articles.

Locating the upper peripheral surface of the transfer roller 45 in a plane substantially tangential to the adjacent portion of the run of the main conveyor belt 15 permits the conveyed articles to pass smoothly over the transfer point, and, as a consequence, the conveying system functions with greater efficiency and achieves improved performance.

Although only a specific construction and adaptation of the present invention has been illustrated and described, it will be understood that both are capable of variation and modification while still employing the principles of the invention, and it is my intention to claim all such variations and modifications without departing from the scope and spirit of the present invention.

Having thus described my invention, what I claim as new and desire to protect by Letters Patent is:

1. An article transfer and auxiliary belt drive apparatus for combination with a main conveyor having a bed and a main conveyor belt, comprising a frame adapted to span said main conveyor at a desired location along its length, a main conveyor belt supporting roller mounted in said frame to support a portion of the main conveyor belt, a roller mounted in said frame to engage a portion of said belt adjacent said supported portion thereof, a floating article transfer roller mounted transversely in said frame adjacent to said belt supporting and engaging rollers and having a peripheral surface thereof substantially tangent to a surface of said supported portion of said main conveyor belt, and means on said frame for securing an end of an auxiliary conveyor adjacent to said transfer roller with said belt engaging roller in frictional driving engagement with the article transfer roller and the auxiliary conveyor.

2. An article transfer and auxiliary conveyor drive apparatus for combination with a main conveyor having a bed and a power driven conveyor belt, comprising a frame adapted to be mounted on a main conveyor at a desired location along the length of its bed, means carried by said frame for supporting a portion of the main belt in relatively offset position, a floating rotatable article transfer roller mounted in said frame adjacent to said supported portion of the main belt and having a peripheral surface thereof substantially tangent to a surface of the offset portion of said main conveyor belt, means for securing an end of an auxiliary conveyor adjacent to said transfer roller, and a floating rotatable drive roller mounted in said frame in driven relation with the main conveyor belt for driving relation with the transfer roller and the auxiliary conveyor.

3. An article transfer and auxiliary conveyor drive apparatus for combination with a main conveyor having a conveyor belt and an auxiliary conveyor, comprising a floating rotatable article transfer means mounted intermediate the main and auxiliary conveyors, and a floating drive means in driven contact with the main conveyor belt and in driving contact with the article transfer means and the auxiliary conveyor.

References Cited in the file of this patent

UNITED STATES PATENTS

| Number | Name | Date |
|---|---|---|
| 866,337 | Cowley | Sept. 17, 1907 |
| 1,686,519 | Cutler | Oct. 9, 1928 |
| 1,896,402 | Griffith | Feb. 7, 1933 |
| 2,001,927 | Van Wyk et al. | May 21, 1935 |
| 2,020,635 | Derome | Nov. 12, 1935 |
| 2,325,919 | Porch | Aug. 3, 1943 |